(12) United States Patent
Catt et al.

(10) Patent No.: US 9,302,763 B2
(45) Date of Patent: Apr. 5, 2016

(54) METHOD FOR DIAGNOSING A TRAILING EDGE FLAP FAULT

(71) Applicant: GE Aviation Systems Limited, Cheltenham (GB)

(72) Inventors: Christopher Joseph Catt, Southampton (GB); Julia Ann Howard, Lee-On-The-Solent (GB)

(73) Assignee: GE AVIATION SYSTEMS LIMITED, Cheltenham (GB)

( * ) Notice: Subject to any disclaimer, the term of this patent is extended or adjusted under 35 U.S.C. 154(b) by 58 days.

(21) Appl. No.: 14/065,875

(22) Filed: Oct. 29, 2013

(65) Prior Publication Data

US 2014/0336865 A1    Nov. 13, 2014

(30) Foreign Application Priority Data

May 13, 2013    (GB) .................................... 1308510.5

(51) Int. Cl.
| | |
|---|---|
| *B64C 9/16* | (2006.01) |
| *B64F 5/00* | (2006.01) |
| *B64D 43/00* | (2006.01) |
| *B64D 45/00* | (2006.01) |

(52) U.S. Cl.
CPC . *B64C 9/16* (2013.01); *B64D 43/00* (2013.01); *B64D 45/0005* (2013.01); *B64F 5/0045* (2013.01); *B64D 2045/001* (2013.01)

(58) Field of Classification Search
CPC .............. B64D 45/0005; B64D 43/00; B64D 2045/001; B64C 9/16; B64F 5/0045
See application file for complete search history.

(56) References Cited

U.S. PATENT DOCUMENTS

| | | | |
|---|---|---|---|
| 3,935,754 A | 2/1976 | Comollo | |
| 5,719,566 A | 2/1998 | Readman et al. | |
| 6,301,531 B1 | 10/2001 | Pierro et al. | |
| 6,382,566 B1 | 5/2002 | Ferrel et al. | |
| 7,264,444 B2 * | 9/2007 | Dunn | 416/97 R |
| 7,290,738 B1 * | 11/2007 | Rogers et al. | 244/207 |
| 8,104,721 B2 | 1/2012 | Pohl | |
| 2002/0077752 A1 * | 6/2002 | Burreson et al. | 701/300 |
| 2006/0097854 A1 | 5/2006 | Basu et al. | |
| 2007/0083301 A1 * | 4/2007 | Yeh | 701/3 |
| 2009/0138147 A1 | 5/2009 | Grinits et al. | |
| 2009/0228409 A1 | 9/2009 | Eklund et al. | |
| 2010/0100355 A1 | 4/2010 | Marx et al. | |
| 2010/0288886 A1 | 11/2010 | Schievelbusch et al. | |
| 2011/0255968 A1 | 10/2011 | Recksiek | |
| 2014/0224007 A1 * | 8/2014 | Horabin et al. | 73/168 |

(Continued)

FOREIGN PATENT DOCUMENTS

| | | |
|---|---|---|
| DE | 102005062919 A1 | 7/2007 |
| EP | 2266880 A1 | 12/2010 |

(Continued)

OTHER PUBLICATIONS

GB Search Report and Written Opinion dated Nov. 13, 2013, issued in connection with corresponding GB Application No. GB1308510.5.

(Continued)

*Primary Examiner* — James Trammell
*Assistant Examiner* — James E Stroud
(74) *Attorney, Agent, or Firm* — GE Global Patent Operation; William S. Munnerlyn

(57) ABSTRACT

A method of diagnosing a trailing edge flap fault in an aircraft having a trailing edge flap system including multiple trailing edge flaps, a flap handle for setting the position of the trailing edge flaps, and a flap position sensor, the method includes receiving a position signal, determining a variation in the position signal relative to a reference position, diagnosing a fault, and providing an indication of the diagnosed fault.

16 Claims, 3 Drawing Sheets

(56) References Cited

U.S. PATENT DOCUMENTS

| | | | | |
|---|---|---|---|---|
| 2014/0229056 A1* | 8/2014 | Catt et al. | ............... | 701/31.9 |
| 2014/0288764 A1* | 9/2014 | Catt et al. | ............... | 701/31.9 |
| 2014/0309819 A1* | 10/2014 | Catt et al. | ............... | 701/3 |
| 2014/0336871 A1* | 11/2014 | Catt et al. | ............... | 701/33.4 |
| 2015/0096359 A1* | 4/2015 | Catt | ............... | 73/112.01 |

FOREIGN PATENT DOCUMENTS

| | | | |
|---|---|---|---|
| EP | 2538034 | A2 | 12/2012 |
| GB | 2492328 | A | 1/2013 |
| WO | 2007074173 | A2 | 7/2007 |
| WO | 2010046111 | A2 | 4/2010 |

OTHER PUBLICATIONS

Combined Search and Examination Report issued in connection with related GB Application No. GB1302236.3 dated Jun. 28, 2013.

Notice of Allowance towards related U.S. Appl. No. 14/065,893 dated Nov. 24, 2014.

\* cited by examiner

METHOD FOR DIAGNOSING A TRAILING EDGE FLAP FAULT

CROSS-REFERENCE TO RELATED APPLICATIONS

This application claims priority under 35 U.S.C. §119 to British Patent Application No. 13085105, filed May 13, 2013, the disclosure of which is incorporated herein by reference in its entirety.

BACKGROUND OF THE INVENTION

Contemporary aircraft may include high lift devices including trailing edge flaps on the trailing edge of the wing. The use of the trailing edge flaps changes the profile of the wing which can increase lift during takeoff or by lowering the stall speed and increasing the drag of the aircraft for landing. Currently, if a fault occurs with one of the trailing edge flaps the trailing edge flap system may be shut down without any determination of what fault has occurred.

BRIEF DESCRIPTION OF THE INVENTION

In one embodiment, the invention relates to a method of diagnosing a trailing edge flap fault in an aircraft having a trailing edge flap system, the method includes receiving a position signal, determining a variation in the position signal, diagnosing a fault in the trailing edge flap system based on the variation, and providing an indication of the diagnosed fault.

DESCRIPTION OF EMBODIMENTS OF THE INVENTION

Figure 1:
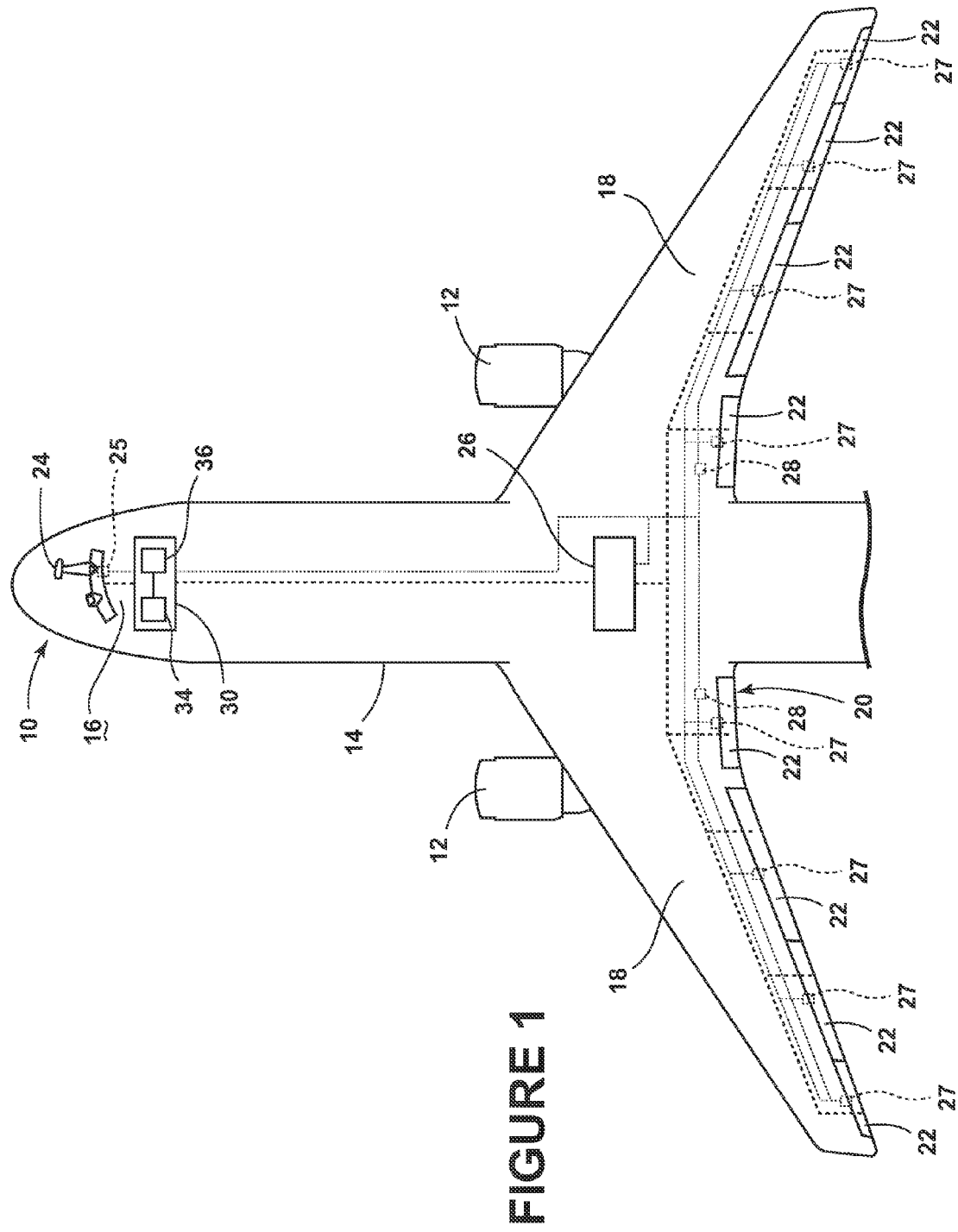
FIG. 1 is a schematic view of an aircraft having an exemplary trailing edge flap system.

FIG. 1 schematically depicts a portion of an aircraft 10 that may execute embodiments of the invention and may include one or more propulsion engines 12 coupled to a fuselage 14, a cockpit 16 positioned in the fuselage 14, and wing assemblies 18 extending outward from the fuselage 14. A trailing edge flap system 20 is included in the aircraft 10 and includes multiple trailing edge flaps 22 on each of the wing assemblies 18. The multiple trailing edge flaps 22 may include hinged surfaces mounted on the trailing edges of each of the wing assemblies 18 to reduce the speed of the aircraft 10, to increase the angle of descent for landing, to change the wing profile, and create lift during takeoff There are many different types of trailing edge flaps 22 and their use may depend on the size, speed, and complexity of the aircraft 10 on which they are to be used. Such differing trailing edge flap types are not germane to the embodiments of the invention and will not be described further herein. Further, while four trailing edge flaps 22 have been illustrated on each of the wing assemblies 18 it may be understood that there may be any number of trailing edge flaps 22 on each of the wing assemblies 18.

A flap handle 24 may be included in the cockpit 16 and may be operated by a pilot to set the position of the multiple trailing edge flaps 22. The flap handle 24 may provide an input to a trailing edge flap drive 26, which may be used to move the multiple trailing edge flaps 22 into the positions set by the flap handle 24. More specifically, each of the multiple trailing edge flaps 22 is set to a specific setting by the flap handle 24. It will be understood that while the multiple trailing edge flaps 22 are set to the same position, the angle at which each of the multiple trailing edge flaps 22 is at may not be equal. For example, for a flap setting of five, a first flap may be at 72 degrees, a second flap may be at 127 degrees, a third flap may be at 142 degrees, and a fourth flap may be at 89 degrees. It will be understood that this specification in referencing the angle of the training edge flap may use the term position. The term flap handle as used in this description is not limited to a physical handle, rather it relates to the control device used to set the position of the flaps. Throughout the early part of aviation, this control device was a handle and the term flap handle has now become generic to the control device used to set the flap position, regardless of whether the control device is an actual handle or a button on a touch-screen user interface. Therefore, the specific drive mechanisms may vary and have not been illustrated for the sake of clarity. A flap handle sensor 25 or other suitable mechanism may be used for determining the position of the flap handle 24; that is, the set position of the flaps. In most aircraft, the flaps have a predetermined number of set positions. While the flaps can be variably, even infinitely adjustable, typically the flaps have a predetermined number of fixed positions.

Further, one or more flap position sensors 27 may be included in the trailing edge flap system 20 and each may output a position signal indicative of the position of at least one of the multiple trailing edge flaps 22. For example, a skew sensor may be operably coupled to each of the multiple trailing edge flaps 22 and indicate the angle of each of the multiple trailing edge flaps 22. Furthermore, a flap position sensor in the form of a position transmitter sensor 28 may be included for each of the wing assemblies 18 and may indicate an overall angle of the multiple trailing edge flaps 22 on each of the wing assemblies 18.

Figure 2:
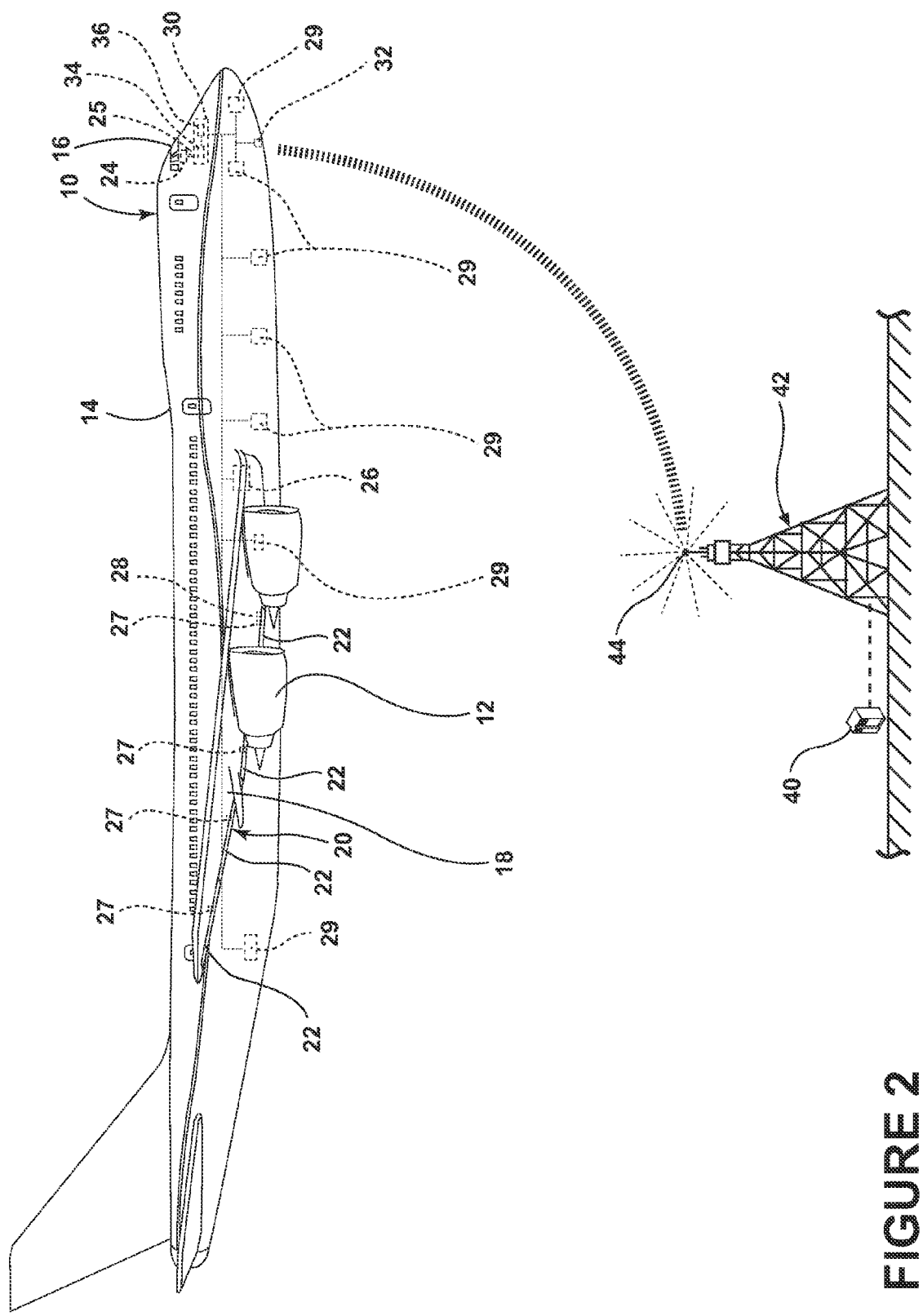
FIG. 2 is a perspective view of the aircraft of FIG. 1 and a ground system in which embodiments of the invention may be implemented.

Referring now to FIG. 2, it may more easily be seen that a plurality of additional aircraft systems 29 that enable proper operation of the aircraft 10 may also be included in the aircraft 10 as well as a controller 30, and a communication system having a wireless communication link 32. The controller 30 may be operably coupled to the plurality of aircraft systems 29 including the trailing edge flap system 20. For example, the trailing edge flap drive 26, the flap handle 24, the flap handle sensor 25, and the one or more flap position sensors 27 including the position transmitter sensors 28 may be operably coupled to the controller 30. Further, an autopilot function may be included in the controller 30 and the autopilot may set the position of the multiple trailing edge flaps 22.

The controller 30 may also be connected with other controllers and electronic units of the aircraft 10. By way of non-limiting example, the controller 30 may include or may be operably coupled to a Flap Slat Electronics Unit (FSEU), which monitors the multiple trailing edge flaps 22 flap asymmetry and flap skew. The controller 30 and FSEU may be operably coupled to a Proximity Switch Electronic Unit (PSEU), which may communicate the position or state of the multiple trailing edge flaps 22 to the other aircraft systems 29.

The controller 30 may include memory 34, the memory 34 may include random access memory (RAM), read-only memory (ROM), flash memory, or one or more different types of portable electronic memory, such as discs, DVDs, CD- ROMs, etc., or any suitable combination of these types of memory. The controller 30 may include one or more processors 36, which may be running any suitable programs. The controller 30 may be a portion of an FMS or may be operably coupled to the FMS.

A computer searchable database of information may be stored in the memory 34 and accessible by the processor 36. The processor 36 may run a set of executable instructions to display the database or access the database. Alternatively, the controller 30 may be operably coupled to a database of information. For example, such a database may be stored on an alternative computer or controller. It will be understood that the database may be any suitable database, including a single database having multiple sets of data, multiple discrete databases linked together, or even a simple table of data. It is contemplated that the database may incorporate a number of databases or that the database may actually be a number of separate databases.

The database may store data that may include reference values including predetermined reference position values for the angle of multiple trailing edge flaps 22 when the flap handle 24 is in a variety of positions. The database may store historical data related to the multiple trailing edge flaps 22 for the aircraft 10 as well as historical trailing edge flap data related to a fleet of aircraft. The historical data may be accumulated over a time period and can include aggregated data. The database may also include predetermined threshold values.

Alternatively, it is contemplated that the database may be separate from the controller 30 but may be in communication with the controller 30 such that it may be accessed by the controller 30. For example, it is contemplated that the database may be contained on a portable memory device and in such a case, the aircraft 10 may include a port for receiving the portable memory device and such a port would be in electronic communication with the controller 30 such that the controller 30 may be able to read the contents of the portable memory device. It is also contemplated that the database may be updated through the wireless communication link 32 and that in this manner, real time information such as information regarding historical fleet wide data may be included in the database and may be accessed by the controller 30.

Further, it is contemplated that such a database may be located off the aircraft 10 at a location such as an airline operation center, flight operations department control, or another location. The controller 30 may be operably coupled to a wireless network over which the database information may be provided to the controller 30.

While a commercial aircraft has been illustrated, it is contemplated that portions of the embodiments of the invention may be implemented anywhere including in a controller or computer 40 at a ground system 42. Furthermore, the database(s) as described above may also be located in a destination server or a computer 40, which may be located at and include the designated ground system 42. Alternatively, the database may be located at an alternative ground location. The ground system 42 may communicate with other devices including the controller 30 and databases located remote from the computer 40 via a wireless communication link 44. The ground system 42 may be any type of communicating ground system 42 such as an airline control or flight operations department.

One of the controller 30 and the computer 40 may include all or a portion of a computer program having an executable instruction set for diagnosing a trailing edge flap fault in the aircraft 10. Such faults may include improper operation of components as well as failure of components. As used herein the term diagnosing refers to a determination after the fault has occurred and contrasts with predicting, which refers to a forward looking determination that makes the fault known in advance of when the fault occurs. Along with diagnosing, the controller 30 and/or computer 40 may detect the fault. Regardless of whether the controller 30 or the computer 40 runs the program for diagnosing the fault, the program may include a computer program product that may include machine-readable media for carrying or having machine-executable instructions or data structures stored thereon. Such machine-readable media may be any available media, which can be accessed by a general purpose or special purpose computer or other machine with a processor. Generally, such a computer program may include routines, programs, objects, components, data structures, algorithms, etc. that have the technical effect of performing particular tasks or implementing particular abstract data types. Machine-executable instructions, associated data structures, and programs represent examples of program code for executing the exchange of information as disclosed herein. Machine-executable instructions may include, for example, instructions and data, which cause a general purpose computer, special purpose computer, or special purpose processing machine to perform a certain function or group of functions.

It will be understood that the aircraft 10 and computer 40 merely represent two exemplary embodiments that may be configured to implement embodiments or portions of embodiments of the invention. While the aircraft 10 is being operated, the flap handle 24 may be utilized to set the position of the multiple trailing edge flaps 22. The flap handle sensor 25 may output a signal indicative of the position of the flap handle 24 and the flap position sensors 27 including the position transmitter sensors 28 may output a position signal indicative of the position of the multiple trailing edge flaps 22. Each of the trailing edge flaps 22 should behave consistently when the flap handle 24 sets the position of the multiple trailing edge flaps as it is not possible to set the trailing edge flaps 22 differently. It will be understood that the angle of each flap may be different whilst they are all set to the same position.

A fault may occur with any portion of the trailing edge flap system 20 and such a fault may be diagnosed by either the aircraft 10 and/or the computer 40. The controller 30 and/or the computer 40 may utilize inputs from the flap handle sensor 25, the flap position sensors 27 including the position transmitter sensors 28, the database(s) and/or information from airline control or flight operations department to diagnose the trailing edge flap fault or detect a fault that the airline maintenance crew were previously unaware of Among other things, the controller 30 and/or the computer 40 may analyze the data output by the flap position sensors 27 to determine differences between the movements of the trailing edge flaps 22. Once a fault in the trailing edge flap system 20 has been diagnosed, an indication may be provided on the aircraft 10 and/or at the ground system 42. It is contemplated that the diagnoses of the trailing edge flap fault may be done during flight, may be done post flight, or may be done at the end of a defined time period or number or defined number of flights. The wireless communication link 32 and the wireless communication link 44 may both be utilized to transmit data such that the fault may be diagnosed by either the controller 30 and/or the computer 40.

Figure 3:
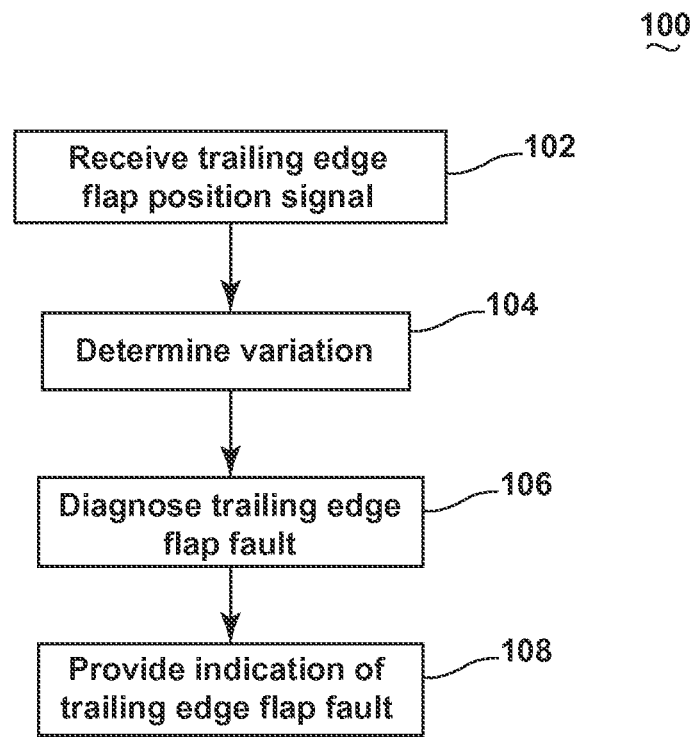
FIG. 3 is a flowchart showing a method of diagnosing a trailing edge flap fault in an aircraft according to an embodiment of the invention.

In accordance with an embodiment of the invention, FIG. 3 illustrates a method 100, which may be used for diagnosing a trailing edge flap fault, which can include a failure. The method 100 begins at 102 by receiving a position signal from a position sensor indicative of a position of at least one of the multiple trailing edge flaps 22. This may include receiving a position signal from one of the flap position sensors 27. This may include receiving multiple position signals from the flap position sensors 27, with each position signal corresponding to a different one of the multiple trailing edge flaps 22. Further, the position signal may indicate a collective position of all of the multiple trailing edge flaps 22 on one of the wing assemblies 18 such as the signal from the position transmitter sensors 28. The position signal may be stored in a storage device on the aircraft 10 and accessed by the controller 30 and/or the computer 40. Alternatively, the position signal may be directly received or relayed to the controller 30 and/or the computer 40.

At 104, the controller 30 and/or the computer 40 may compare the position signal to a reference position value to determine a variation. The reference position value may include any number of reference values related to the trailing edge flap system 20. For example, the reference position value may include a value related to a position of any of the multiple trailing edge flaps 22, a collective position of the multiple trailing edge flaps 22 on one of the wing assemblies 18, historical information regarding the position of the at least one of the multiple trailing edge flaps 22, and historical information regarding the collective position of the multiple trailing edge flaps 22 on one of the wing assemblies 18. Furthermore, the reference position value may include a flap handle position. In such an instance, the method may include determining a position of the flap handle 24 such as by receiving an output from the flap handle sensor 25 to define the reference position value. Alternatively, the reference position values may be stored in one of the database(s) as described above.

In this manner, the position signals received from the flap position sensors 27 may be compared to a reference value to define a variation. For example, the variation may include comparing at least two of the multiple position signals, with one of the multiple position signals being treated as the reference position value. The variation may include comparing the position signal of the trailing edge flaps 22 on the different wing assemblies 18. Any number of comparisons may be made to determine any number of variations. The determined variation may be any suitable variation including a variation of magnitude, a determination of the variation over time, etc.

At 106, a fault in the trailing edge flap system may be diagnosed based on the variation. For example, a fault in the trailing edge flap system 20 may be diagnosed when the variation has been determined to satisfy a predetermined threshold value. In this manner, the controller 30 and/or the computer 40 may determine if the variation is acceptable. The term "satisfies" the threshold is used herein to mean that the variation comparison satisfies the predetermined threshold, such as being equal to, less than, or greater than the threshold value. It will be understood that such a determination may easily be altered to be satisfied by a positive/negative comparison or a true/false comparison. For example, a less than threshold value can easily be satisfied by applying a greater than test when the data is numerically inverted.

Faults may be diagnosed by looking at any number of variations. For example, the variation may indicate an out of range reading and a fault may be diagnosed based on such out of range values. The number of readings from the flap position sensors 27 that are outside the designated range for valid sensor outputs may be recorded. If the number exceeds a designated threshold, then a fault may be diagnosed. Depending on whether this happens with an individual sensor or multiple sensors determines what fault is diagnosed in each particular case. For example, a fault may be diagnosed with a flap position sensor when a number of out of range readings for the flap position sensor satisfies a predetermined threshold. Additional examples may include the determined variations and diagnosis shown in Table 1 below.

TABLE 1

Exemplary Determined Variations and Diagnosis

| Determined Variations | Diagnosis |
| --- | --- |
| Left and right position transmitter outputs do not agree. | Trailing Edge Flaps Position Transmitter Fault |
| Skew sensor output indicates sensor fault. | Trailing Edge Flaps Skew Sensor 1 Fault |
| Skew sensor output indicates sensor fault. | Trailing Edge Flaps Skew Sensor 2 Fault |
| Skew sensor output indicates sensor fault. | Trailing Edge Flaps Skew Sensor 3 Fault |
| Skew sensor output indicates sensor fault. | Trailing Edge Flaps Skew Sensor 4 Fault |
| Skew sensor output indicates sensor fault. | Trailing Edge Flaps Skew Sensor 5 Fault |
| Skew sensor output indicates sensor fault. | Trailing Edge Flaps Skew Sensor 6 Fault |
| Skew sensor output indicates sensor fault. | Trailing Edge Flaps Skew Sensor 7 Fault |
| Skew sensor output indicates sensor fault. | Trailing Edge Flaps Skew Sensor 8 Fault |
| Large number of readings that are significantly out of range from skew sensor 1. | Trailing Edge Flaps Skew Sensor 1 Fault |
| Large number of readings that are significantly out of range from skew sensor 2. | Trailing Edge Flaps Skew Sensor 2 Fault |
| Large number of readings that are significantly out of range from skew sensor 3. | Trailing Edge Flaps Skew Sensor 3 Fault |
| Large number of readings that are significantly out of range from skew sensor 4. | Trailing Edge Flaps Skew Sensor 4 Fault |
| Large number of readings that are significantly out of range from skew sensor 5. | Trailing Edge Flaps Skew Sensor 5 Fault |
| Large number of readings that are significantly out of range from skew sensor 6. | Trailing Edge Flaps Skew Sensor 6 Fault |
| Large number of readings that are significantly out of range from skew sensor 7. | Trailing Edge Flaps Skew Sensor 7 Fault |
| Large number of readings that are significantly out of range from skew sensor 8. | Trailing Edge Flaps Skew Sensor 8 Fault |
| Large number of readings that are significantly out of range from all skew sensors. | PSEU/FSEU Fault |

Further, the overall angle of the flaps on left and right wing assemblies 18 may be compared against each other. If the difference exceeds a threshold then a fault with one of the position transmitter sensors 28 may be diagnosed. By way of further example, the angle of each of the multiple trailing edge flaps 22 may be compared to the pre-set position dictated by the flap handle 24. Differences between the current reading and historical data allow a fault in the flap position sensors 27 to be diagnosed. For example, where a large number of readings from a particular flap position sensor 27 are out of range it can be diagnosed that the flap position sensor 27, rather than other system parts, is at fault. The position signals may also be checked for un-commanded motion, which may be diagnosed as a separate fault type including for example, a flap handle sensor fault or a mechanical fault.

In implementation, the reference values and comparisons may be converted to an algorithm to diagnose faults in the trailing edge flap system 20. Such an algorithm may include, among other things, that if the difference between the left position transmitter signal (PTS) and the right PTS is greater than ten degrees and is greater than ten degrees for at least two of the last three flights then this diagnoses a TE Flaps Position transmitter fault, if the difference between a skew sensor and its reference position, or historical position of the corresponding sensor on the other wing is greater than ten degrees and the difference between the Left PTS and Right PTS is less than ten degrees and this is the case for at least two of the last three flights then this implies a fault with that skew sensor, if the difference between readings from a skew sensor and its reference position is greater than forty degrees for at least two of the last three flights then this implies a fault with the that skew sensor, and if the difference between readings from at least two sensors on one wing and their reference position is greater than forty degrees for at least two of the last three flights then this implies a PSEU or FSEU fault. Such an algorithm may be converted to a computer program comprising a set of executable instructions, which may be executed by the controller 30 and/or the computer 40. Such an algorithm or computer program may process the position signals in any number of ways including analyzing the medians and means of such data. Furthermore, faults may be diagnosed where a predetermined number of readings out of a designated number cross a threshold. Faults may be diagnosed when the flap handle 24 is at one flap setting or it may be required that similar behavior be seen over multiple or all settings of the flap handle 24. Such information may be used to differentiate between faults and diagnose the part that caused the fault.

At 108, the controller 30 and/or the computer 40 may provide an indication of the fault in the trailing edge flap system 20 diagnosed at 110. The indication may be provided in any suitable manner at any suitable location including in the cockpit 16 and at the ground system 42. For example, the indication may be provided on a primary flight display (PFD) in a cockpit 16 of the aircraft 10. For example, if the controller 30 ran the program, then the suitable indication may be provided on the aircraft 10 and/or may be uploaded to the ground system 42. Alternatively, if the computer 40 ran the program, then the indication may be uploaded or otherwise relayed to the aircraft 10. Alternatively, the indication may be relayed such that it may be provided at another location such as an airline control or flight operations department or maintenance center.

It will be understood that the method of diagnosing a trailing edge flap fault is flexible and the method illustrated is merely for illustrative purposes. For example, the sequence of steps depicted is for illustrative purposes only, and is not meant to limit the method 100 in any way as it is understood that the steps may proceed in a different logical order or additional or intervening steps may be included without detracting from embodiments of the invention. By way of non-limiting example, multiple position signals may be compared to a number of reference position values to define numerous variations. Further, diagnosing the fault may be based on data from a single flight or multiple flights.

Additionally the method may receive multiple position signals from multiple flap position sensors 27, with each position signal corresponding to a different trailing edge flap 22. A fault with a FSEU or a PSEU may be diagnosed when a number of out of range readings for each of the multiple flap position sensors satisfies a predetermined threshold. Further, the method may include receiving a position signal from position sensors for each wing. The position signals may be from the position transmitter sensors 28, which each indicate a collective position of all of the trailing edge flaps on each of the wings, respectively. The position signals from each may be compared to define a position comparison. A fault with one of the position transmitter sensors 28 may be diagnosed when the position comparison satisfies a predetermined threshold. For example, the fault may be diagnosed when the position comparison satisfies the predetermined threshold a predetermined number of times over a predetermined number of flights. Further, it is contemplated that maintenance data related to predicted faults or previously diagnosed faults in the trailing edge flap system 20 may be received by the controller 30 and/or the computer 40. The received maintenance data may indicate an accuracy of previous diagnosed faults or predicted faults. Based on such information the controller 30 and/or the computer 40 may further diagnose the fault based on the received maintenance data including specifically diagnosing the fault type or severity of the fault.

Technical effects of the above described embodiments include that data gathered by the aircraft during flight may be utilized to diagnose trailing edge flap faults. This reduces maintenance times and the operational impact of faults and issues due to the trailing edge flaps systems. Particularly there may be a reduction in the time required to diagnose an issue and issues may be diagnosed accurately. This allows for cost savings by reducing maintenance cost, rescheduling cost, and minimizing operational impacts including minimizing the time aircraft are grounded.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of diagnosing a trailing edge flap fault in an aircraft having a trailing edge flap system including multiple trailing edge flaps, a flap handle for setting the position of the trailing edge flaps, and a flap position sensor, the method comprising:
   receiving a position signal from the flap position sensor;
   determining, by a controller, a variation in the position signal relative to a reference position;
   diagnosing, by a controller, a fault in the trailing edge flap system based on the variation; and
   providing, by a controller, an indication of the diagnosed fault.

2. The method of claim 1 wherein the diagnosing the fault is based on data from a single flight.

3. The method of claim 1 wherein the determined variation indicates an out of range reading.

4. The method of claim 3 wherein the receiving the position signal comprises receiving multiple position signals from multiple flap position sensors, with each position signal corresponding to a different trailing edge flap.

5. The method of claim 4 wherein the fault is diagnosed when a number of out of range readings for each of the multiple flap position sensors satisfies a predetermined threshold.

6. The method of claim 5 wherein the fault is diagnosed as a fault with a Flap Slat Electronics Unit or a Proximity Switch Electronic Unit.

7. The method of claim 3 wherein the fault is diagnosed when a number of out of range readings for the flap position sensor satisfies a predetermined threshold.

8. The method of claim 7 wherein the fault is diagnosed as a fault with the flap position sensor.

9. The method of claim 1 wherein the receiving the position signal comprises receiving a position signal from position sensors for each wing.

10. The method of claim 9 wherein the position signals each indicate a collective position of all of the trailing edge flaps on each of the wings, respectively.

11. The method of claim 10, further comprising comparing the position signals to define a position comparison.

12. The method of claim 11 wherein the fault is diagnosed when the position comparison satisfies a predetermined threshold.

13. The method of claim 12 wherein the fault is diagnosed when the position comparison satisfies the predetermined threshold a predetermined number of times over a predetermined number of flights.

14. The method of claim 13 wherein the fault is diagnosed as a fault with the position sensor that indicates the collective position of all of the trailing edge flaps on the wing.

15. The method of claim 1 wherein the position signal may be stored in a storage device on the aircraft and accessed by the controller.

16. The method of claim 1 wherein the providing the indication comprises providing the indication on a PFD in a cockpit of the aircraft.

* * * * *